US011023591B2

(12) United States Patent
Case et al.

(10) Patent No.: US 11,023,591 B2
(45) Date of Patent: Jun. 1, 2021

(54) DATA PROCESSING SYSTEM HAVING DISTRIBUTED SECURITY CONTROLLER WITH LOCAL CONTROL AND METHOD FOR SECURING THE DATA PROCESSING SYSTEM

(71) Applicant: NXP B.V., Eindhoven (NL)

(72) Inventors: Lawrence Loren Case, Austin, TX (US); Mark Norman Fullerton, Austin, TX (US); Thomas Ernst Friedrich Wille, Hamburg (DE); Sebastian Stappert, Hamburg (DE)

(73) Assignee: NXP B.V., Eindhoven (NL)

( * ) Notice: Subject to any disclaimer, the term of this patent is extended or adjusted under 35 U.S.C. 154(b) by 320 days.

(21) Appl. No.: 16/246,633

(22) Filed: Jan. 14, 2019

(65) Prior Publication Data

US 2020/0226265 A1   Jul. 16, 2020

(51) Int. Cl.
*G06F 21/57* (2013.01)
*G06F 21/55* (2013.01)

(52) U.S. Cl.
CPC .......... *G06F 21/577* (2013.01); *G06F 21/554* (2013.01); *G06F 2221/033* (2013.01)

(58) Field of Classification Search
CPC ................. G06F 21/577; G06F 21/554; G06F 2221/033; G06F 21/70; G06F 21/57
See application file for complete search history.

(56) References Cited

U.S. PATENT DOCUMENTS

| | | | |
|---|---|---|---|
| 7,003,677 B1* | 2/2006 | Herzberg | H04L 9/0833 380/286 |
| 9,600,265 B2 | 3/2017 | Excoffier et al. | |
| 9,912,737 B2 | 3/2018 | Patin et al. | |
| 9,930,010 B2 | 3/2018 | Sun et al. | |
| 2007/0209072 A1* | 9/2007 | Chen | G06F 21/10 726/16 |
| 2008/0235790 A1* | 9/2008 | Malhotra | G06F 21/604 726/20 |
| 2015/0169024 A1* | 6/2015 | Jammer | G01R 21/133 700/286 |
| 2015/0379276 A1* | 12/2015 | Glickman | G06F 21/602 713/193 |
| 2016/0094573 A1* | 3/2016 | Sood | H04L 63/0428 713/156 |

(Continued)

*Primary Examiner* — Meng Li
(74) *Attorney, Agent, or Firm* — Daniel D. Hill (57) ABSTRACT

A data processing system includes a plurality of subsystems, a plurality of local security controllers, and a central security controller. Each subsystem of the plurality of subsystems has a security component for providing a security function. A local security controller corresponds to each one of the subsystems. Each local security controller ensures compliance of the security component with local security policies of the subsystem to which the local security controller corresponds. The central security controller is coupled to the local security controller of each of the plurality of subsystems. The central security controller ensures data processing system compliance with system wide security policies. In the event of a detected security violation, the local security controller may respond automatically, without involvement of the central security controller. A method for securing the data processing system is also provided.

19 Claims, 4 Drawing Sheets

(56) References Cited

U.S. PATENT DOCUMENTS

| | | | | |
|---|---|---|---|---|
| 2016/0255061 A1* | 9/2016 | Syed-Ebrahim | ...... | H04L 63/045 |
| | | | | 713/171 |
| 2017/0295220 A1 | 10/2017 | Chen et al. | | |
| 2019/0065739 A1* | 2/2019 | Manadhata | ............. | H04L 63/08 |
| 2019/0065787 A1* | 2/2019 | Bildhaiya | ............ | G07C 5/0808 |
| 2020/0156805 A1* | 5/2020 | Andrus | ..................... | F02C 9/46 |

* cited by examiner

DATA PROCESSING SYSTEM HAVING DISTRIBUTED SECURITY CONTROLLER WITH LOCAL CONTROL AND METHOD FOR SECURING THE DATA PROCESSING SYSTEM

BACKGROUND

Field

This disclosure relates generally to data processing systems, and more particularly, to a data processing system having a distributed security controller with local control and method for securing the data processing system.

Related Art

In large data processing systems, such as system-on-a-chip (SoC) systems with multiple subsystems, security components may be distributed among the various subsystems. The security components in the subsystems typically require crypto keys, firmware authentication processes, memory erasure, etc., that are managed by a trustworthy source. A security controller establishes and maintains trustworthiness at boot time for all the security components in the system, and the trustworthiness is locked for the remainder of the power cycle, or until the next system secure boot. A single security state is used for all the security components. If a system state signal arises that jeopardizes the security of one of the security components, then that signal is fed back to transition the single state machine to a fail-secure mode that then affects all the security components in the system. The subsystems may have security components from various vendors, so there may not be a standard method for managing the security state of security components provided by third parties.

For power savings, a subsystem and its components may be powered off and on at any time. For example, fast crypto hardware may use fast digital logic cells that consume or leak a significant amount of power. It may be desirable to power off the crypto hardware when not in use. However, the management of power of the subsystems is typically handled by a power management function that is not designed or scrutinized for security. Also, any subsystem may be subjected to other non-security related system state controls including, for example, debug state controls. The security controller of the SoC is isolated and only performs internal cryptography and internal key handling services but cannot leverage its own trustworthiness for the enhancement of security of the rest of the SoC platform.

Therefore, a need exists for a data processing system that solves at least some of the above problems.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Generally, there is provided, a data processing system having a plurality of subsystems and a central security controller. Each subsystem of the plurality of subsystems has a local security controller that provides security control for the subsystem based on local system state conditions. For example, the security state of the local security controller, as presented to the subsystem, may prevent the security component of the subsystem from entering into some states, accessing local memory or registers, or powering down the system, depending on the local security policy. Also, a detected localized fault in a subsystem, such as test or debug mechanism activation, tamper detection, glitches, may cause an automatic response from the corresponding local security controller. The automatic response may result in, for example, lockout of the subsystem from the rest of the SoC, subsystem clean-up, subsystem shutdown, or disablement of subsystem security components. Generally, in the event a fault is detected, a subsystem will automatically fail-secure locally so that immediately its security-sensitive data or control are not exposed, and the compromised subsystem is contained to limit impact to the rest of the SoC or system. The local security controller will provide a notification of the failure to the central security controller. Using a local security controller for each subsystem in this manner provides immediate response to subsystem state conditions. Also, in the event of detection of an attempted tamper, secret keys may be immediately erased, access blocked, etc. In addition, subsystems do not have to share a common security state.

In accordance with an embodiment, there is provided, a method for securing a data processing system having a plurality of subsystems, the method including: configuring a state of a security component in each subsystem of the plurality of subsystems; checking state enforcement controls of a local security controller corresponding to, and located in, each of the plurality of subsystems; enabling the security component in a subsystem of the plurality of subsystems; detecting a fault in the security component of the subsystem using the local security controller of the subsystem; generating a response to the fault by the local security controller; and notifying a central security controller of the fault. Checking the state enforcement controls of the local security controller may further include the central security controller checking the state enforcement controls of the local security controllers in each of the plurality of subsystems. Detecting the fault in the security component may further include detecting tampering with the security component. The security component may include one or more of a memory, a cryptographic accelerator, a memory cipher, and a data interface located in the subsystem. Detecting the fault in the security component may further include detecting tampering with a secret key, an authentication process, or a memory erasure. Generating the response to the fault may further include causing only the subsystem affected by the fault to be powered down. Generating the response to the fault may further include causing the subsystem affected by the fault to operate without enabling the security component. The method may be implemented in the data processing system using a state machine in the local security controller of each of the plurality of subsystems, and wherein the subsystem affected by the fault may be recovered into a secure state without affecting other subsystems of the data processing system. Generating the response to the fault may further include preventing the subsystem from operating in an affected state of the subsystem.

In another embodiment, there is provided, a data processing system including: a plurality of subsystems, each subsystem of the plurality of subsystems having a security component for providing a security function; a plurality of local security controllers, a local security controller corresponding to one of the subsystems of the plurality of subsystems, each local security controller for ensuring compliance of the security component with local security policies of the subsystem to which the local security controller corresponds; and a central security controller, the central security controller coupled to the local security controller of each of the plurality of subsystems, the central security controller ensuring data processing system compliance with system wide security policies. Each of the plurality of local security controllers may include a state machine, the state machine of a local security controller may detect a fault within the corresponding subsystem and provide a response to the fault without interacting with the central security controller. The fault detection may further include the local security controller detecting tampering with the corresponding subsystem. The response to the fault may further include the local security controller causing the corresponding subsystem to be powered down. The local security controller may provide the response independently of the central security controller. The local security controller may notify the central security controller of the response to the fault. The response to the fault detection may further include enabling the subsystem without enabling sensitive functions of the security component.

In yet another embodiment, there is provided, a data processing system including: a plurality of subsystems, each subsystem of the plurality of subsystems having a security component for providing a security function; a plurality of local security controllers, a local security controller corresponding to, and located in, each one of the subsystems of the plurality of subsystems, each local security controller for enforcing compliance of the security component of the subsystem with local security policies; and a central security controller, the central security controller coupled to the local security controller of each of the plurality of subsystems, the central security controller enforcing compliance of data processing system with system wide security policies, wherein the system wide security policies are different than the local security policies. The security function may further include one or more of memory security, secret key security, and cryptographic accelerator security of a subsystem. The data processing system may be characterized as being a multi-processor system-on-a-chip (SoC). The data processing system may further include a local security controller of the plurality of local security controllers powering down an affected subsystem in response to the local security controller detecting a fault in the security component of the subsystem.

Figure 1:
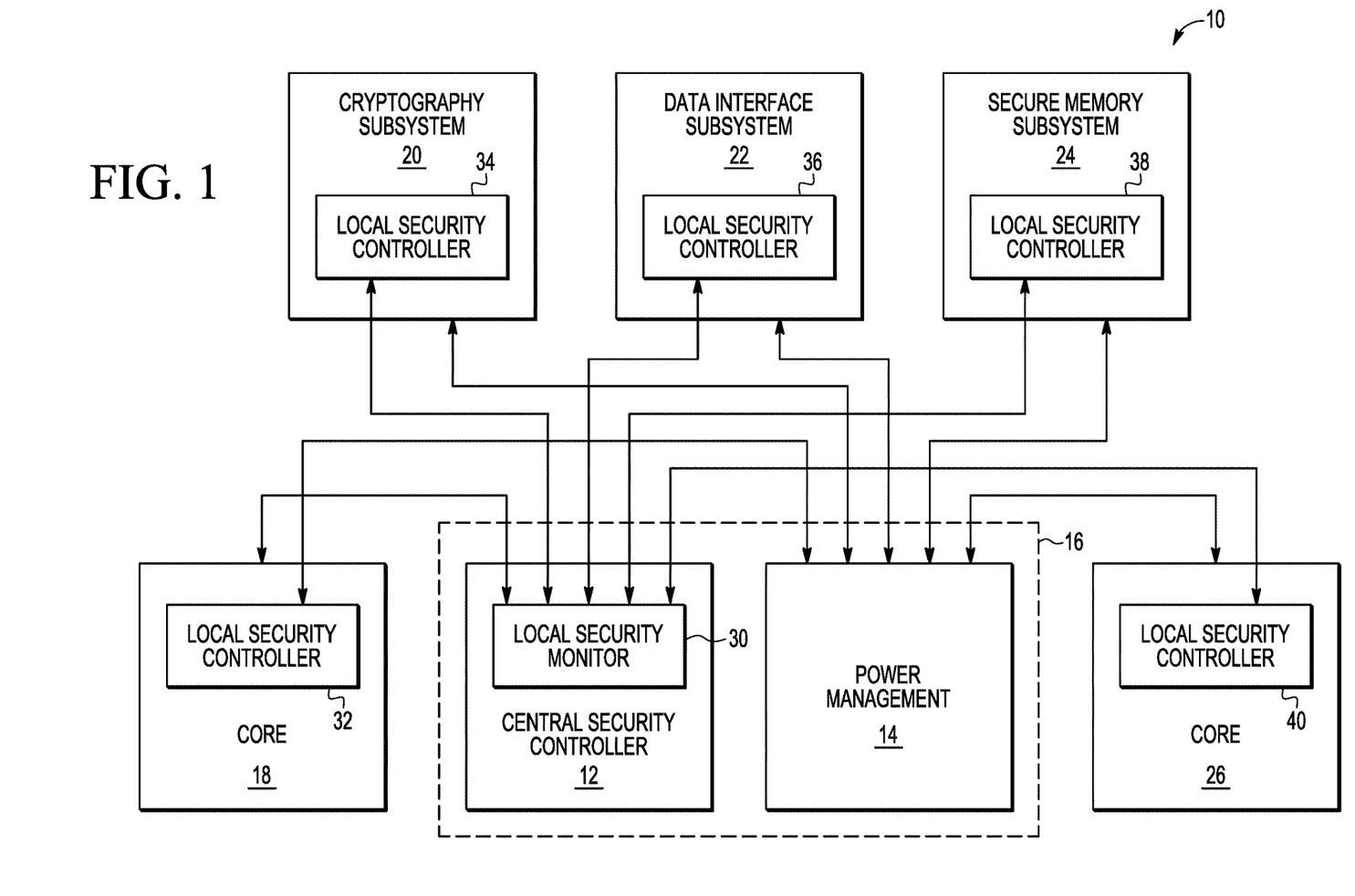
FIG. 1 illustrates a data processing system in accordance with an embodiment.

FIG. 1 illustrates a data processing system 10 in accordance with an embodiment. Data processing system 10 may be a system-on-a-chip (SoC) and implemented as one or more integrated circuits. Data processing system 10 includes a central security controller 12, a power management unit 14, and subsystems 18, 20, 22, 24, and 26. As illustrated, each of the plurality of subsystems may provide different functionality. Also, each of the plurality of subsystems may include a local security controller. For example, subsystem 18 is illustrated as a microprocessor core and includes local security controller 32. Subsystem 20 is illustrated as having a cryptography security component and includes local security controller 34. Subsystem 22 is illustrated as a data interface security component such as for example, a high definition video interface (HDMI) and includes local security controller 36. Subsystem 24 is illustrated as a secure memory security component and includes local security controller 38. Subsystem 26 is illustrated as another microprocessor core and includes local security controller 40. Each local security controller interfaces with central security controller 12. Central security controller 12 includes local security monitor 30 for interfacing with, controlling, and monitoring the operation of local security controllers 32, 34, 36, 38, and 40. In the illustrated embodiment, because at least a portion of central security controller 12 needs to be powered up all the time, central security controller 12 and power management unit 14 are located in power domain 16. Central security controller 12 may provide control over the operation of power management unit 14 in addition to controlling the operation of the local security controllers. Note that the security components illustrated in FIG. 1 are only examples and not intended to be limiting of the types of security components or functions that can be used in data processing system 10.

In operation, each of local security controllers 32, 34, 36, 38, and 40 provides a security function for the subsystem it is located in. Because the functionality of the subsystems may differ from one subsystem to the next, as illustrated in FIG. 1, the security policies may necessarily be different between the subsystems. Local security controllers 32, 34, 36, 38, and 40 each provide a "root-of-trust" for its corresponding subsystem and ensures that each of subsystems 18, 20, 22, 24, and 26 complies with the local security policies that applies individually to each corresponding subsystem. Central security controller 12, on the other hand, ensures compliance with system wide security policies that apply to data processing system 10. Also, central security controller 12 monitors the operations and security state of each of local security controllers 32, 34, 36, 38, and 40 to ensure that each of the local security controllers provides the intended root-of-trust for the subsystems. The local security controllers may each have a state machine that can enforce the local security policies independently of central security controller 12. Each of the local security controllers may have different security policies as required by the different subsystems. In response to detecting a fault, the local security controllers can disable and even cause the power down of the affected subsystem without affecting the operation of unaffected subsystems. Instead of disabling a subsystem that has been compromised, the local security controllers may block entrance into a compromised state or disable an individual security component if a complete disablement is not necessary. Also, a subsystem affected by a detected fault may be recovered into a secure state without affecting the other subsystems of system 10. The use of local control of the subsystems means the response time to a detected fault can be relatively short compared to the response time that may be provided by a central security controller to a fault in a subsystem.

Figure 2:
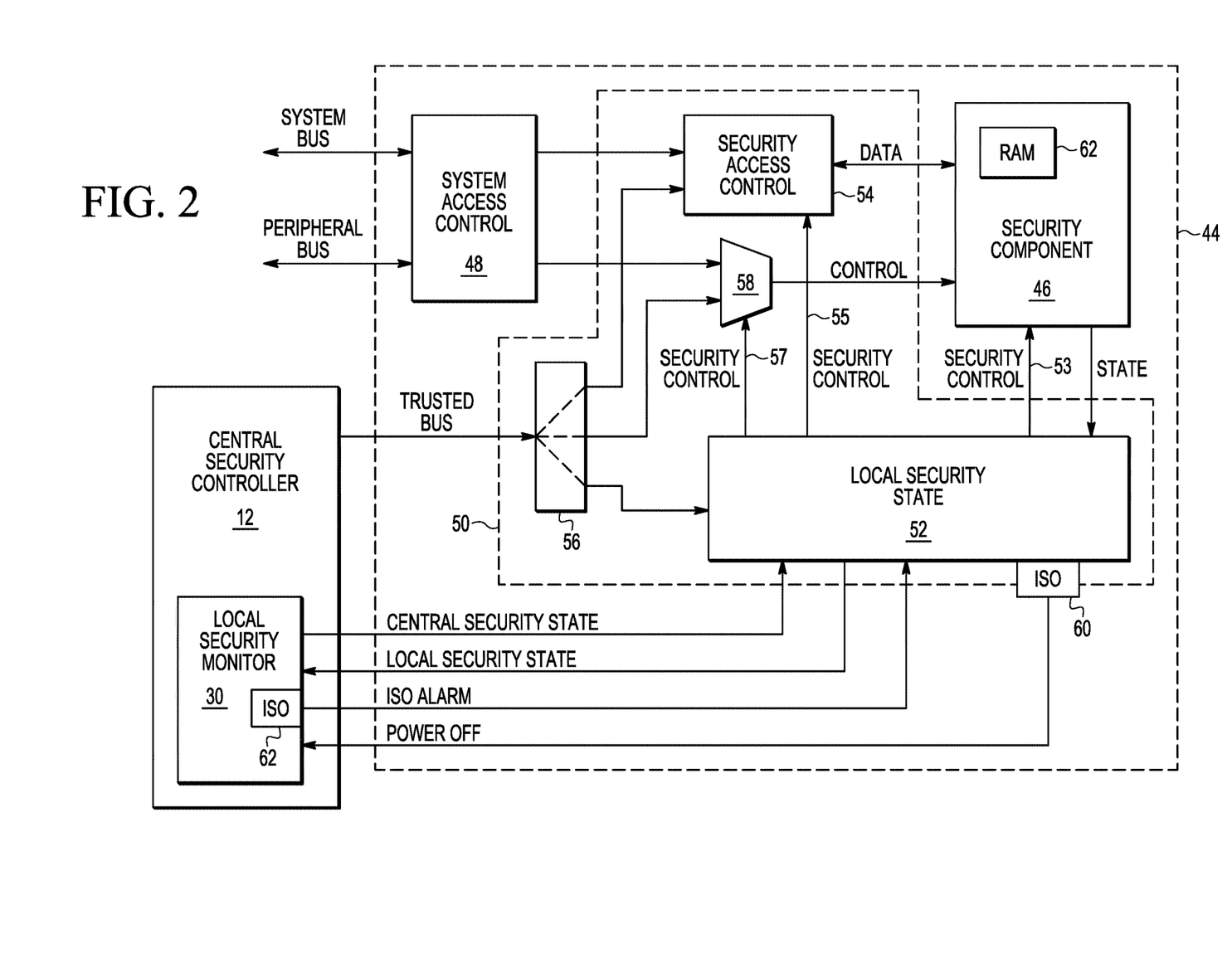
FIG. 2 illustrates an example subsystem of the data processing system of FIG. 1 in accordance with embodiment.

FIG. 2 illustrates an example subsystem 44 of data processing system 10 in accordance with an embodiment. Subsystem 44 represents a general view of a possible implementation of one of subsystems 18, 20, 22, 24, and 26. However, because of different functionality, there may be differences between subsystems not reflected in the embodiment of FIG. 2. Subsystem 44 is shown coupled to central security controller 12. Subsystem 44 includes security component 46, system access control 48, and local system controller 50. Local system controller 50 includes local security state block 52, security access control 54, switch 56, multiplexer 58, and isolation circuit (ISO) 60. Local security monitor 30 includes an isolation circuit 62. Each of the plurality of subsystems of data processing 10 may include a security component like security component 46. Each of the security components may provide a different type of secure functionality to subsystem 44. For example, the security component may include a cryptographic accelerator, a memory cipher, and a data interface. In the illustrated embodiment, security component 46 is also shown with secure random-access memory (RAM) 62 that may be secured by the local security policies of local security controller 50.

In local security controller 50, local security state block 52 provides the local security policies for the subsystem. In one embodiment, local security state block 52 may be implemented using a state machine. The state machine may be implemented in software, hardware, or a combination of software and hardware. Central security controller 12 provides signals to indicate the state of central security controller 12 via local security monitor 30 labeled "CENTRAL SECURITY STATE". Local security state block 52 is coupled to provide the state of subsystem 44 labeled "LOCAL SECURITY STATE" to central security controller 12. Power off is one of the states of security component 46. The central security controller 12 is notified of the power off state of subsystem 44 via power off signal "POWER OFF". Isolation circuit 60 automatically indicates when subsystem 44 is powered off. Central security controller 12 may need to know the subsystem is powered off in case it wants to perform an operation such as writing a cryptography key to security component 46. Central security controller 12 is coupled to the lowest power domain of the system, for example, the same power domain as power management unit 14. If central security controller 12 is powered off, this may violate a system security policy and all the security components of the system would be notified automatically via signal "ISO ALARM" from isolation circuit 62. Local security controller 50 controls access to security component 46. A trusted bus labeled "TRUSTED BUS" is coupled between central security controller 12 and switch 56. Switch 56 provides a demultiplexing function to direct communications from central security controller 12 to one of security access control 54, multiplexer 58, or local security state block 52. The destination of the communications over the TRUSTED BUS may be determined by, e.g., address bits provided in a communication over the bus. Local security state block 52 also provides control signals (SECURITY CONTROL) for controlling multiplexer 58, security access control 54, and security component 46. Security control signal 53 is provided for controlling security component 46. System access control 48 is coupled to a system bus (SYSTEM BUS), and a peripheral bus (PERIPHERAL BUS). Security access control 54 is controlled by security control signal 55 and receives data (DATA) from another portion of data processing system 10, or from a location external to data processing system 10, via system access control 48. Control signals are provided to an input of multiplexer 58 by system access control 48. In response to security control signal 57 from local security state 52, multiplexer 58 directs control signals (CONTROL) from either switch 56 or from system access control 48. System access control 48 controls access from non-security related assets of data processing system 10, while security access control 48 controls access to security component 46 from other security related assets of data processing system 10.

Figure 3:
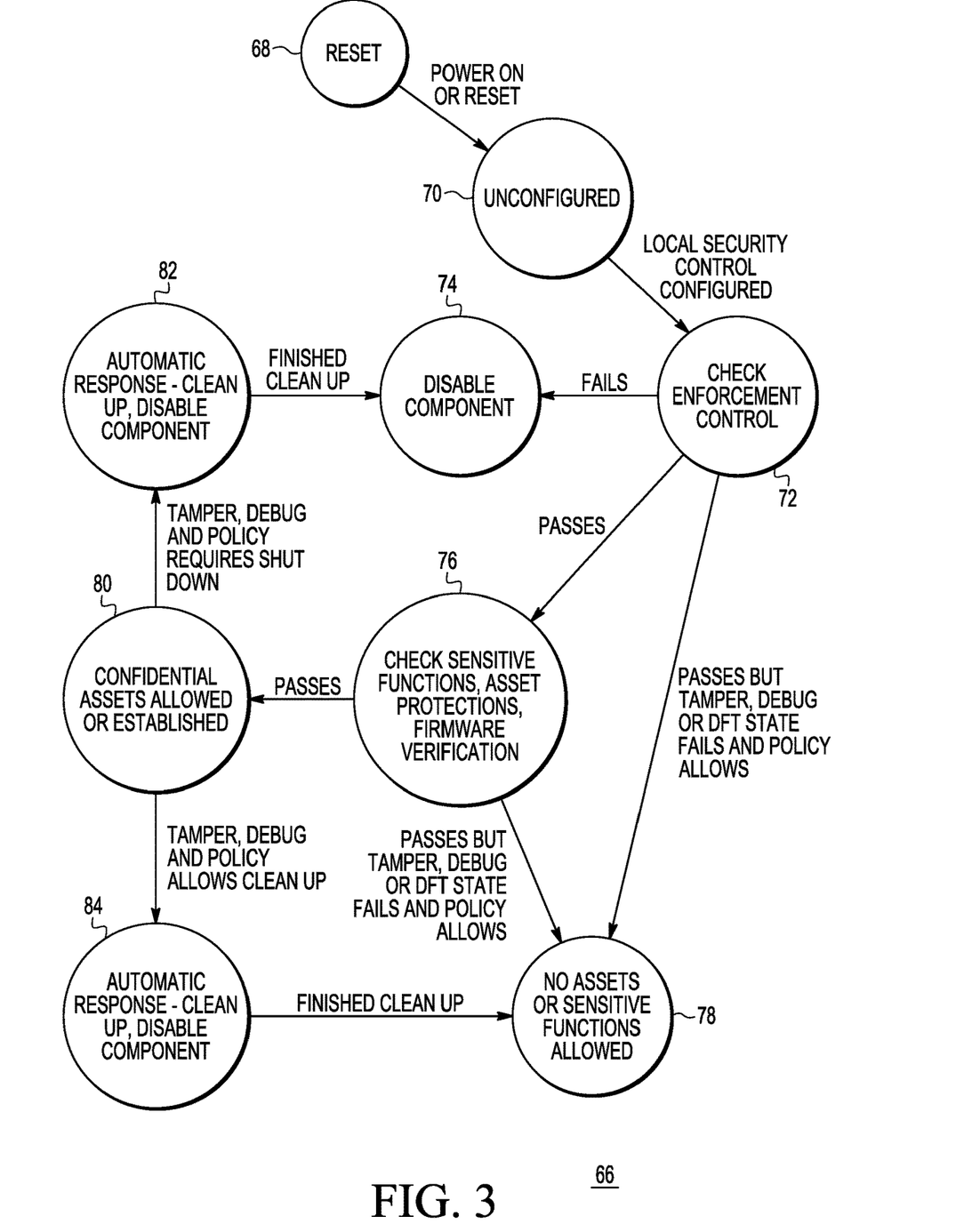
FIG. 3 illustrates a state diagram for the subsystem of FIG. 2 in accordance with an embodiment.

FIG. 3 illustrates state diagram 66 for the subsystem 44 of FIG. 2 in accordance with an embodiment. State diagram 66 can vary from one subsystem to another based on differences in security policy between the subsystems of FIG. 1. As mentioned above, the various subsystems may have different capabilities and different security needs requiring different security policies. in the states of state diagram 66, signals are driven into the subsystem from local security state block 52 and elsewhere to enforce security policies and protect assets. Reference will be made to the subsystem block diagram of FIG. 2 in the state description. State diagram 66 begins in reset state 68. Reset state 68 may also be a powered off state. The subsystem transitions to unconfigured state 70 in response to receiving a reset command or instruction. In unconfigured state 70, register contents are reset to an initial state. RAM 62 in security component 46 may also require clean-up or erasure as directed by central security controller 12. Then, in state 72, local security controller 50 is configured and local state enforcement controls are checked by central security controller 12. If at state 72, the local security controller 50 fails the local state enforcement controls check, security component 46 is disabled at state 74. If local security controller 50 passes the local enforcement checks, the subsystem transitions to state 76. However, if local controller 50 passes the local enforcement check but tamper, debug, and design for test (DFT) protections fail and the security policy allows, the subsystem transitions to state 78. At state 78, the subsystem is enabled, but no security assets or sensitive functions are activated.

At state 76, after passing the enforcement controls, sensitive functions of security component 46 are checked. Also, it is determined if various asset protections are in place, and firmware in security component 46 is verified. If the subsystem passes the checks at state 76, the state changes to state 80. If the subsystem passes the checks, except that the tamper, debug, and DFT protections fail and the security policy for the subsystem allows, the subsystem transitions to state 78. At state 80, after all the checks have passed, and the security of confidential assets is established, security component 46 is enabled for operation. If the subsystem is operating at state 80 and a fault, such as a security violation is detected in security component 46, the security policy of the subsystem may require subsystem shutdown, or the security policy may allow clean up. Also, the subsystem may not be allowed to operate in the affected state. The detected fault may include, but is not limited to, detected tampering with a secret key, an authentication process issue, or an unauthorized memory erasure. If the security policy allows clean up and then shutdown, the state transitions automatically, without interaction from central security controller 12, from state 80 to state 82. At state 82, clean-up of security component 46 is performed and the state transitions to state 74 where security component 46 is disabled. If the security policy allows clean up, the state automatically transitions from state 80 to state 84, independently of, and without interaction from, central security controller 12. At state 84, clean-up of security component 46 is performed and the state transitions from state 84 to state 78. At state 78, the subsystem operates with no sensitive assets or sensitive functions activated. Alternately, depending on the nature of the detected failure, the component may be allowed to operate in a secure state with functioning but degraded security assets. In addition, the subsystem may be placed in reset or firewalled from the rest of the system except from central security controller 12. Depending on the application, other responses and policies to fault detection may be used in system 10. Central security controller 12 is notified of any detected faults in security component 46. Although not illustrated in FIG. 3, a transition back to reset state 68 can be performed from any of the other states.

Figure 4:
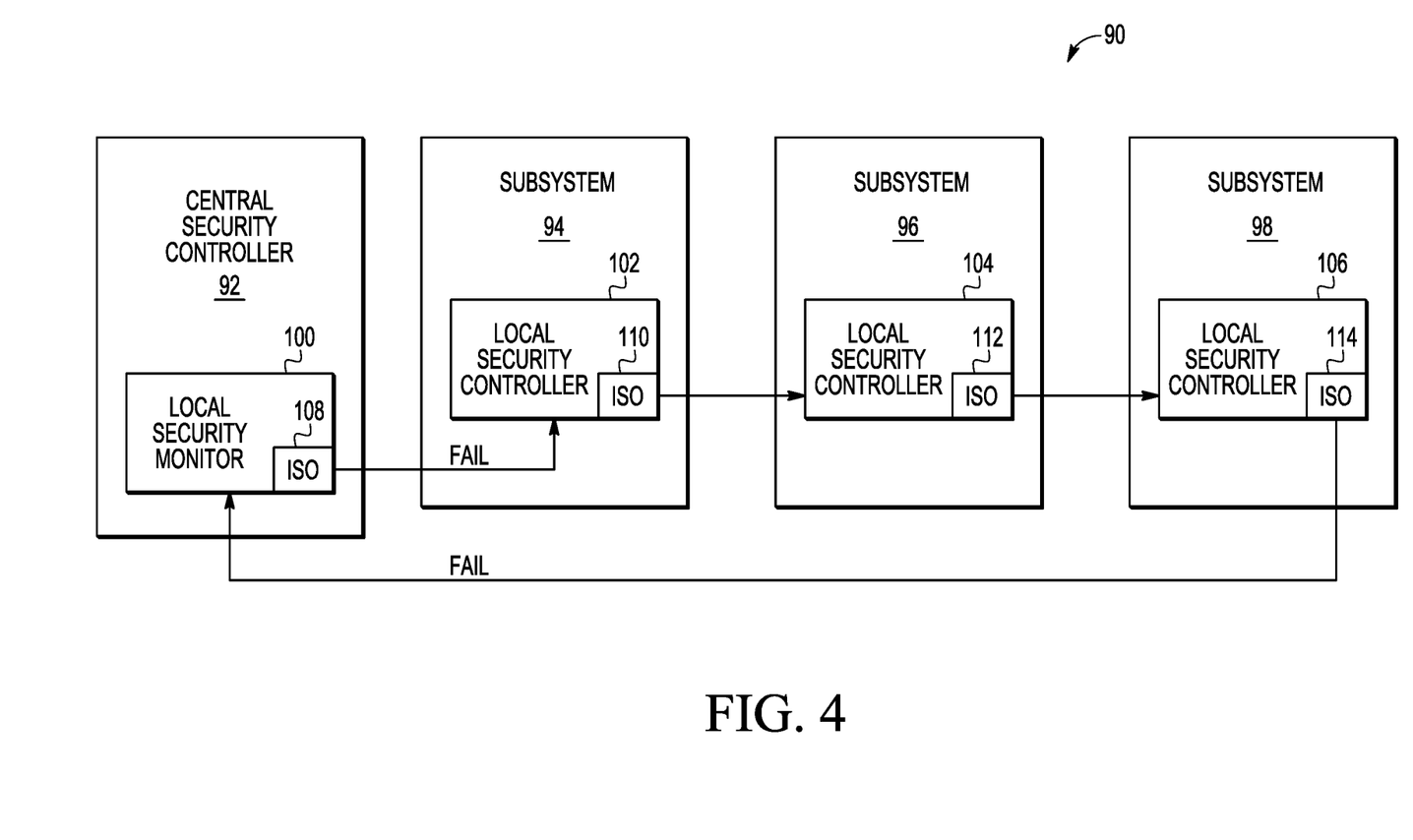
FIG. 4 illustrates a portion of a data processing system in accordance with another embodiment.

FIG. 4 illustrates a portion 90 of a data processing system in accordance with another embodiment. Portion 90 includes central security controller 92, and subsystems 94, 96, and 98. Central security controller 92 includes local security monitor 100, and local security monitor 100 includes isolation circuit 108. Subsystem 94 includes local security controller 102, and local security controller 102 includes isolation circuit 110. Subsystem 96 includes local security controller 104, and local security controller 104 includes isolation circuit 112. Subsystem 98 includes local security controller 106, and local security controller 106 includes isolation circuit 114. Isolation circuit 108 is coupled to provide a fail signal FAIL to local security controller 102. Likewise, isolation circuit 110 is coupled to local security controller 104, isolation circuit 112 is coupled to local security controller 106, and isolation circuit 114 is coupled to provide a fail signal, also labeled FAIL to local security monitor 100. The isolation circuits automatically indicate when the subsystems are powered off.

FIG. 4 illustrates that the subsystems can be chained together so that one subsystem depends upon another subsystem. If one subsystem, such as subsystem 94 detects a fault, isolation circuit 110 notifies local security controller 104, and all the local security controllers located downstream of local security controller 104 may be notified and appropriate action taken.

Using a local security controller for each subsystem, as described in the above embodiments, provides local control and immediate response to subsystem state conditions. Also, in the event of a tamper detection, secret keys may be immediately erased, access blocked, etc. In addition, subsystems do not have to share a common security state so that the entire system does not necessarily fail in the event of a detected fault.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, NVM, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for securing a data processing system having a plurality of subsystems, the method comprising:
configuring a state of a security component in each subsystem of the plurality of subsystems;
checking state enforcement controls of a local security controller corresponding to, and located in, each of the plurality of subsystems;
in response to passing the state enforcement controls check, enabling the security component in a subsystem of the plurality of subsystems;
detecting a fault in the security component of the subsystem using the local security controller of the subsystem;
generating a response to the fault by the local security controller, the response including disabling the security component of the subsystem;
allowing the subsystem affected by the fault to operate without the security component; and
notifying a central security controller of the fault.

2. The method of claim 1, wherein checking the state enforcement controls of the local security controller further comprises the central security controller checking the state enforcement controls of the local security controllers in each of the plurality of subsystems.

3. The method of claim 1, wherein detecting the fault in the security component further comprises detecting tampering with the security component.

4. The method of claim 1, wherein the security component comprises one or more of a memory, a cryptographic accelerator, a memory cipher, and a data interface located in the subsystem.

5. The method of claim 1, wherein detecting the fault in the security component further comprises detecting tampering with a secret key, an authentication process, or a memory erasure.

6. The method of claim 1, wherein generating the response to the fault further comprises causing only the subsystem affected by the fault to be powered down.

7. The method of claim 1, further comprising performing a clean-up or erasure of a random-access memory of the security component as directed by the central security controller.

8. The method of claim 1, wherein the method is implemented in the data processing system using a state machine in the local security controller of each of the plurality of subsystems, and wherein the subsystem affected by the fault is recovered into a secure state without affecting other subsystems of the data processing system.

9. The method of claim 1, wherein generating the response to the fault further comprises preventing the subsystem from operating in an affected state of the subsystem.

10. A data processing system comprising:
a plurality of subsystems, each subsystem of the plurality of subsystems having a security component for providing a security function;
a plurality of local security controllers, a local security controller corresponding to one of the subsystems of the plurality of subsystems, each local security controller for ensuring compliance of the security component with local security policies of the subsystem to which the local security controller corresponds, wherein the local security controller generates a response to a fault in the corresponding subsystem, the response including disabling the security component of the subsystem, and wherein the subsystem affected by the fault is allowed to operate without the security component; and a central security controller, the central security controller coupled to the local security controller of each of the plurality of subsystems, the central security controller ensuring data processing system compliance with system wide security policies, wherein each of the plurality of local security controllers comprises a state machine, the state machine of a local security controller detecting the fault within the corresponding subsystem and providing the response to the fault without interacting with the central security controller.

11. The data processing system of claim 10, wherein the fault detection further comprises the local security controller detecting tampering with the corresponding subsystem.

12. The data processing system of claim 10, wherein the response to the fault further comprises the local security controller causing the corresponding subsystem to be powered down.

13. The data processing system of claim 12, wherein the local security controller provides the response independently of the central security controller.

14. The data processing system of claim 13, wherein the local security controller notifies the central security controller of the response to the fault.

15. The data processing system of claim 10, wherein the central security controller causes a clean-up or erasure of a random access memory of the security component.

16. A data processing system comprising:

a plurality of subsystems, each subsystem of the plurality of subsystems having a security component for providing a security function;

a plurality of local security controllers, a local security controller corresponding to, and located in, each one of the subsystems of the plurality of subsystems, each local security controller for enforcing compliance of the security component of the subsystem with local security policies, wherein the local security controller generates a response to a fault in the corresponding subsystem, the response including disabling the security component of the subsystem, and wherein the subsystem affected by the fault is allowed to operate without the security component; and a central security controller, the central security controller coupled to the local security controller of each of the plurality of subsystems, the central security controller enforcing compliance of data processing system with system wide security policies, wherein the system wide security policies are different than the local security policies.

17. The data processing system of claim 16, wherein the security function further comprises one or more of memory security, secret key security, and cryptographic accelerator security of a subsystem.

18. The data processing system of claim 16, wherein the data processing system is characterized as being a multi-processor system-on-a-chip (SoC).

19. The data processing system of claim 16, further comprises a local security controller of the plurality of local security controllers powering down an affected subsystem in response to the local security controller detecting a fault in the security component of the subsystem.

* * * * *